Nov. 26, 1963   J. S. SENEY   3,112,070
CONDITION RESPONSIVE INDICATING AND CONTROL SYSTEM
Filed June 13, 1960   5 Sheets-Sheet 1
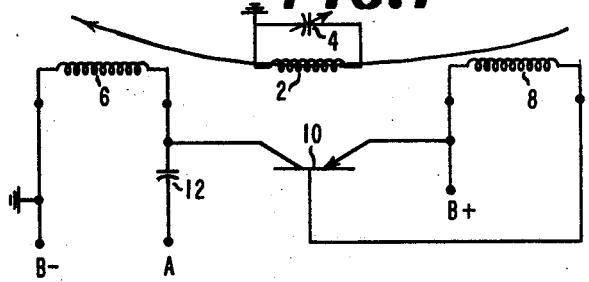
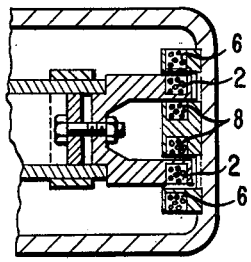
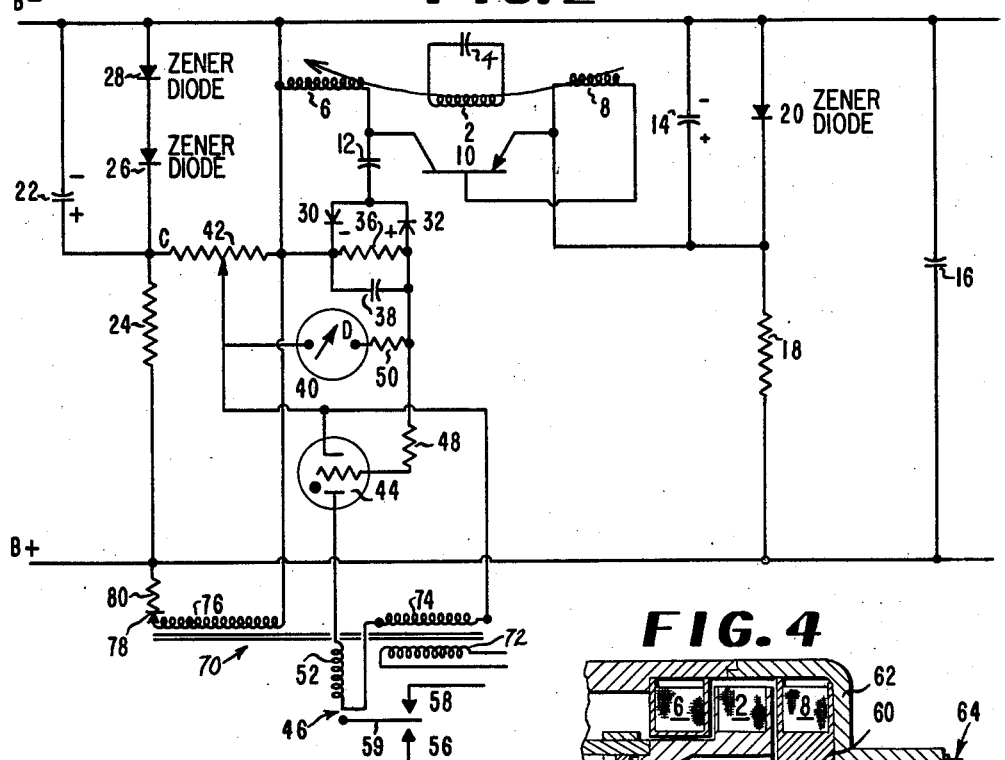
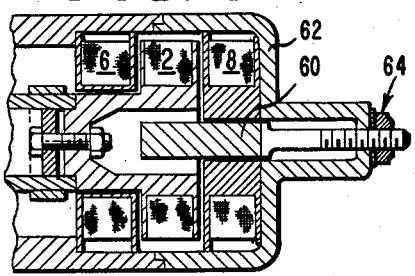
INVENTOR
JOHN SEMOUR SENEY
BY *Harry E. Braddock*
ATTORNEY Nov. 26, 1963 J. S. SENEY 3,112,070
CONDITION RESPONSIVE INDICATING AND CONTROL SYSTEM
Filed June 13, 1960 5 Sheets-Sheet 2

INVENTOR
JOHN SEMOUR SENEY

BY *Harry E. Braddock*
ATTORNEY

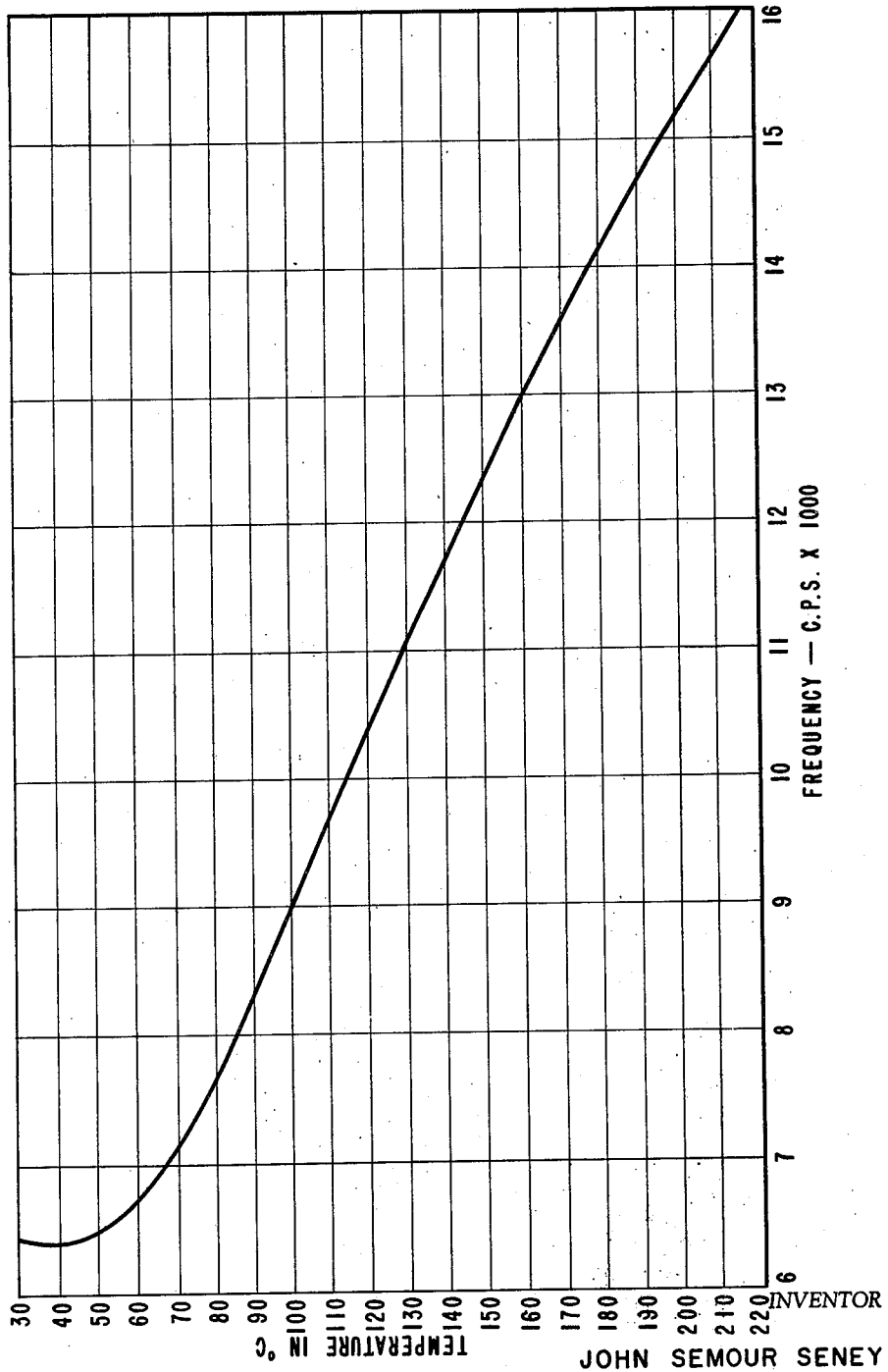

Nov. 26, 1963   J. S. SENEY   3,112,070
CONDITION RESPONSIVE INDICATING AND CONTROL SYSTEM
Filed June 13, 1960   5 Sheets-Sheet 4

INVENTOR
JOHN SEYMOUR SENEY
BY
*Harry E. Braddock*
ATTORNEY

Nov. 26, 1963   J. S. SENEY   3,112,070
CONDITION RESPONSIVE INDICATING AND CONTROL SYSTEM
Filed June 13, 1960   5 Sheets-Sheet 5
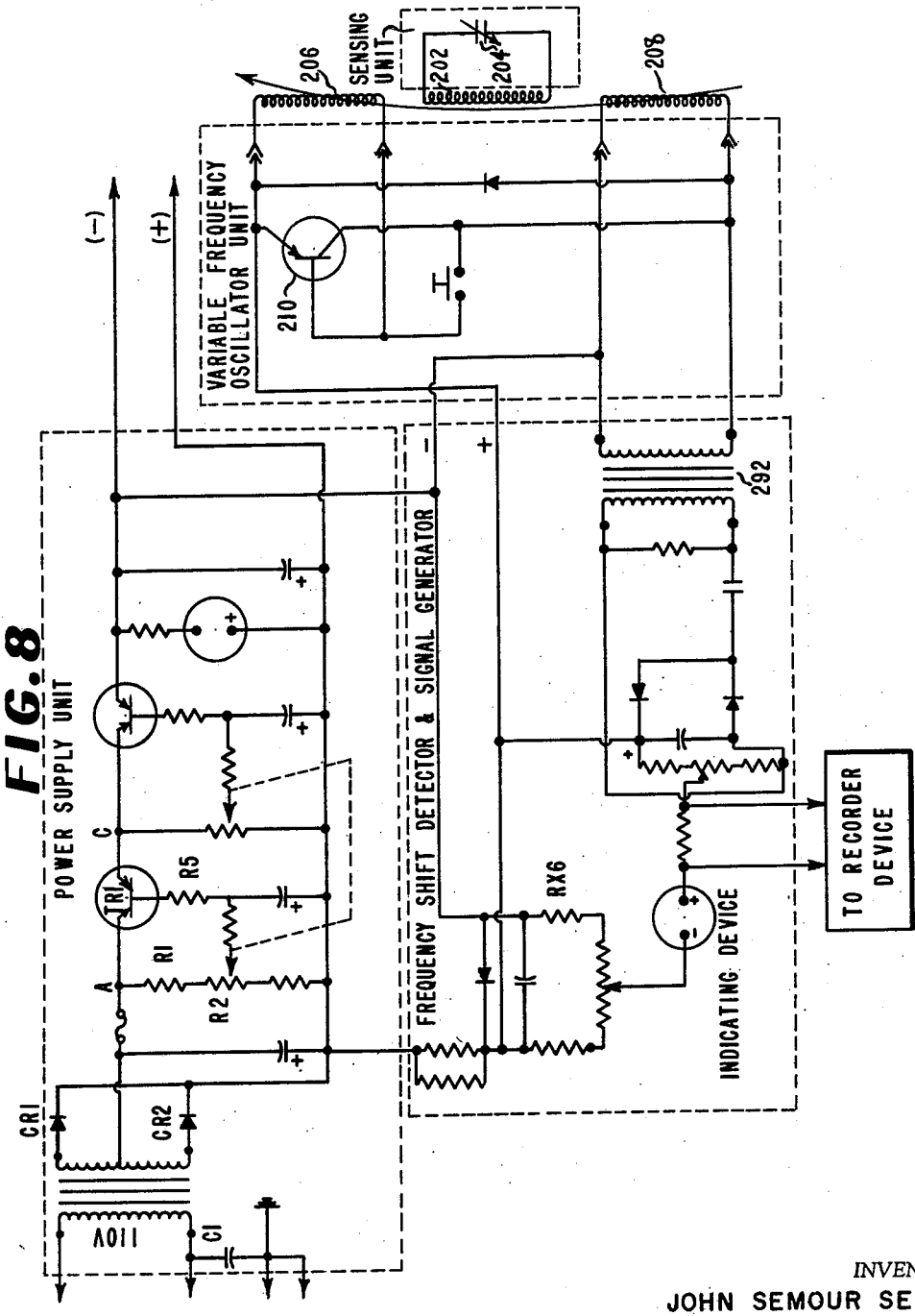
INVENTOR
JOHN SEMOUR SENEY
BY
Harry E. Braddock
ATTORNEY 3,112,070
CONDITION RESPONSIVE INDICATING AND
CONTROL SYSTEM
John Seymour Seney, Seaford, Del., assignor to E. I.
du Pont de Nemours and Company, Wilmington, Del.,
a corporation of Delaware
Filed June 13, 1960, Ser. No. 35,818
3 Claims. (Cl. 236—78)

This invention relates to the field of detecting changes in given conditions at a given point and generating an electrical signal to indicate the change at a point spaced from the given point. More specifically, the invention involves an improved arrangement for detecting changes in given conditions on a moving object and causing the generation of an electrical signal at a stationary point responsive to the change in the conditions without mechanical or electrical connections between the moving object and the stationary point. It is a known practice in transmitting a signal from a point on a moving or a rotary object to use an electrical signal which is transmitted to a stationary position by means of frictional contacts such as slip rings, or in some cases by means of actually transmitting radio signals between the moving object and the stationary point. Frictional contact devices have not been entirely satisfactory in many cases because of wear at high operating speeds, varying resistance across the frictional elements which produces erratic signals, high initial cost, high maintenance costs, and alignment problems. In situations where there are problems with respect to space, weight or balance of the moving object, the installation of a radio transmitter and power supply on the object is extremely complicated and difficult, if not undesirable or impossible. The further addition of condition change detection means on the moving object to control the generated signal, of course additionally complicates the problem.

It is an object of this invention to provide a compact, simple yet reliable arrangement for detecting changes in condition on a moving object and generating a signal at a stationary point adjacent the path of the moving object, which signal is responsive to the changes in the condition.

It is a further object to provide an improved simple system for detecting changes in temperature on an object rotating at very high speeds and generating an electrical signal responsive to such changes at a stationary point adjacent said rotating object without mechanical or electrical contact with the rotating object, or the need for installing complex apparatus on the rotating object.

A yet more specific objective is the provision of an effective reliable system for determining changes in the temperature of rapidly rotating hot roll elements used in the preparation of textile yarns and, at a stationary position adjacent said roll elements, generating an electrical signal responsive to such changes, which signal can be used for indication or actual control of the temperature by regulation of heating apparatus.

Another object of the invention is the practical utilization in a control system of the natural variation in electrical characteristics of a capacitance element according to the temperature of the element to generate an electrical signal which is related to the temperature of the element and of its environment.

Generally speaking, the objects of my invention are achieved by establishing adjacent the path of a moving object, at least one set of two inductively coupled coil windings of a self-excited electrical oscillator system, which coils produce an oscillating magnetic field of given frequency, and establishing on said moving object a third coil winding connected across a condition-responsive capacitance element and arranged to become inductively coupled with the two coil windings adjacent the path of the moving object during some portion of the movement of the object and vary the given frequency of oscillation of the set of coils in accordance with the electrical value of the capacitance element, which value varies in accordance with the change in the condition to which the capacitance element is responsive. The generation and transmission of the desired information is accomplished without mechanical or electrical contact, and without complex bulky equipment on the moving object or at the stationary point.

More specifically, in the preferred embodiment of my invention in which the moving object is a rotating roll element used in the treatment of textile fiber strands and yarns, the three coil windings are arranged so that the magnetic coupling between them is continuously maintained so that a continuous information signal on the roll element temperature is maintained for indication and/or control, whether the roll element is in rotary motion or stationary.

Additional advantages, objects, and applications of the invention will appear from a consideration of the following specification and the accompanying drawings in which:

FIG. 1 is a general schematic circuit diagram of the basic arrangement of a system embodying features of the present invention.

FIG. 2 is a circuit diagram showing the circuit arrangement of one embodiment of a system embodying features of the invention.

FIG. 3 is a partial longitudinal cross sectional view of one embodiment of the coil windings and related structure of this invention.

FIG. 4 is a partial longitudinal cross sectional view of another embodiment of the coil windings and related structure according to the invention.

FIG. 5 is a graphical representation of the variation of the output indicating or control signal with respect to temperature.

FIG. 8 is a schematic circuit diagram of a preferred embodiment of a temperature indicating and/or recording arrangement embodying features of this invention.

Figure 1A:
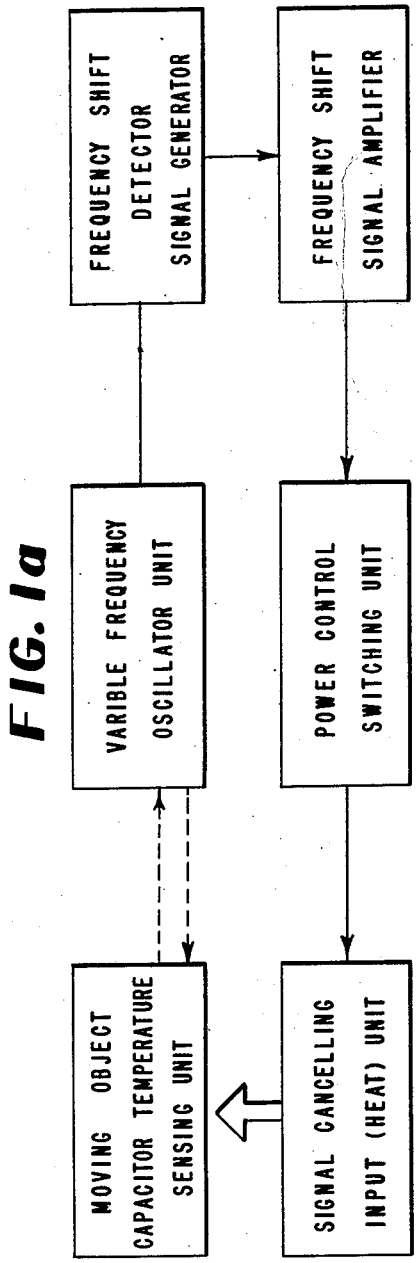
FIG. 1A is a general block diagram illustrating a preferred embodiment of the present invention.

The basic elements of the invention are shown in FIG. 1. Inductive coil 2 is mounted on the rotating element and is electrically connected in parallel with the condition-responsive capacitor element 4. Inductive coils 6 and 8 are mounted to a stationary base structure. One lead of coil 6 is connected to ground or B— while the other lead of coil 6 is connected to the collector electrode of transistor element 10. A positive voltage or B+ is supplied to the emitter electrode of the transistor element 10 and to one lead of coil 8. The other lead of coil 8 is connected to the base or gate control electrode of the transistor element 10. The output signal of the system is obtained at lead A through capacitor 12, being measured above ground or the B-voltage level.

FIG. 2 shows the basic elements of FIGURE 1 in conjuncton with other components of a circuit arrangement used for operative indication and control of the condition affecting capacitor 4. The power supply may be, conveniently, 110 volts 60 cycle alternating current which is supplied to the primary winding 72 of isolating transformer 70. The secondary winding 76 of this transformer, with rectifying diode 78 and current limiting resistor 80, supply direct current at 130 volts, B+ voltage. Capacitors 14, 16, resistor 18 and Zener type voltage regulating diode 20 maintain the voltage applied to oscillator coil 8 and transistor element 10 at 3.9 volts in conventional manner. In a similar manner, capacitor 22, resistor 24, and Zener type voltage limiting diodes 26 and 28 maintain the voltage at point C at 44 volts. Rectifying diodes 30 and 32, resistor 36, and capacitor 38 constitute a discriminator or frequency measuring circuit which produces a D.C. output voltage proportional to the frequency of the alternating current power applied thereto. Meter 40 indicates directly the D.C. output voltage proportional to the frequency of the oscillating system and it may be biased by a voltage obtained from voltage divider 42 for adjustment purposes described later. Thyratron tube 44 amplifies the D.C. voltage output signal to operate the relay 52 which controls power to apply a compensating or follow-up input to capacitor 4. In the preferred application of the invention, this power energizes the heater which affects the temperature-sensing capacitor 4. Resistors 48 and 50 are current limiting resistors. Secondary winding 74 of the transformer supplies power to thyratron 44.

One physical arrangement of the inductive windings 2, 6, and 8 with the windings in concentric radial alignment is shown in FIG. 3. Another arrangement with the coils in axial alignment is illustrated in FIG. 4 which also shows a cylindrical iron slug 60 which is positioned as desired to adjust the inductive coupling between the coils by threaded engagement with frame 62 and locked in desired position by nut 64.

The system of the invention operates as follows, referring to FIG. 2: Upon application of power through transformer 70, current begins to flow through the circuit branch containing winding 6 and transistor 10, creating a magnetic field or flux which builds up at a rate controlled by the impedance characteristics of mutually inductive windings 2, 6, and 8 as well as of capacitor 4. Voltage induced in winding 8 by the increasing magnetic field is applied to the control electrode or base of transistor 10 in such a way as to cut off further current through the transistor 10 and winding 6. Cessation of current flow through transistor 10 and winding 6 causes the magnetic field linking the windings 2, 6, and 8 to decay at a rate controlled again by the impedance characteristics of these windings and the capacitor 4. Variation in the build-up and decay of the magnetic field and hence voltage across the windings is controlled by variation in the capacitance characteristics of capacitor 4. Upon completion of the decay or decrease of the magnetic field and voltage applied to the control electrode or base of transistor 10, transistor 10 again passes current through winding 6 to initiate another cycle in the continuous oscillations of this circuit which will continue so long as power is supplied thereto. In the preferred embodiment of my invention the capacitance characteristics of capacitor 4 are made to vary with temperature change within desired limits and the oscillator coils are designed in such a way that the frequency of the oscillating system will vary substantially linearly with the temperature of capacitor 4, as shown in FIG. 5. The output of the oscillating system capacitor 12 is applied to the discriminator network consisting of diodes 30 and 32, resistor 36 and capacitor 38 which converts it into a direct current signal which is proportional to the frequency of the oscillating system output. This direct current signal is applied to indicating meter 40 at terminal D. If it is desired to have the meter 40 indicate temperature directly, the only connection to the meter 40 will be to terminal D. If it is desired to indicate the error or change from a given set temperature, a biasing voltage from voltage divider 42 is applied to the meter to give a differential indication. This same direct current signal, biased or unbiased, is applied to thyratron 44 grid to control its firing which actuates heater relay 46 and switch element 54 to control the heater input which affects heat sensitive capacitor 4 which in turn generates a signal cutting off the heater when the desired temperature is reached.

If it is desired to achieve continuous proportional control of the heat input and temperature at capacitor 4, the direct current output signal can be applied to a unit such as a solid state silicon controlled rectifier instead of the thyratron, the output of which would then be and continuously applied to the heat input means rather than through a relay as discussed above.

Figure 6:
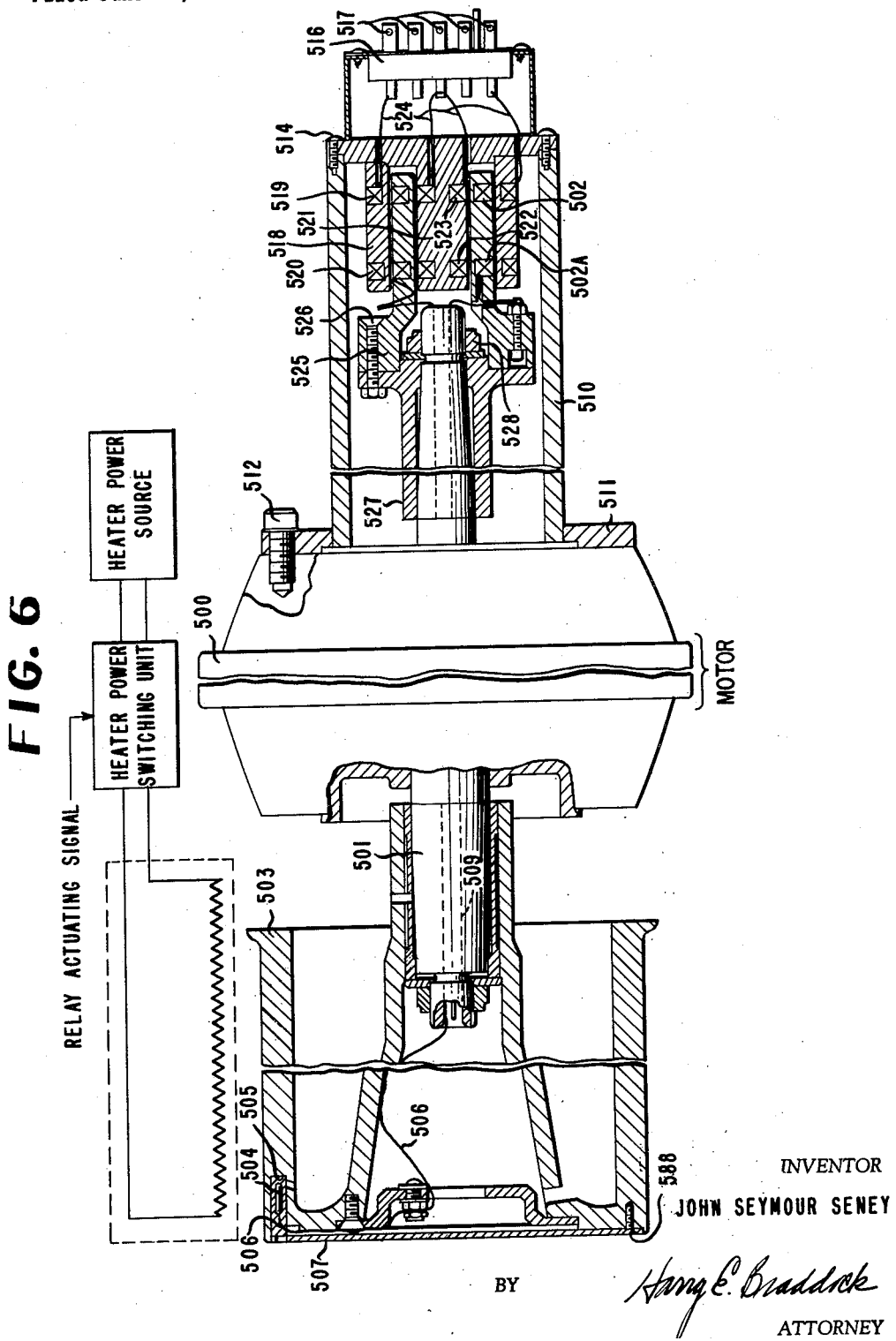
FIG. 6 is a side elevational view partly in section showing one structural arrangement for controlling the temperature of a driven heated roll in a textile yarn treatment apparatus embodying features of the present invention.

In FIG. 6 an actual arrangement of structure is shown to illustrate a preferred application of the invention to a motor driven heated roll mechanism used in the preparation of textile yarns. In this figure there is shown an electrical motor 500 with rotary output shaft 501 having fixedly secured at one end thereof a cylindrical roll element 503 of the type used in the treatment of textile fiber yarns. As shown, a suitable heater means is positioned adjacent the roll 503 to maintain it at the proper temperature as required by the yarn treatment. In axially aligned cavities or chambers 505 formed in the end of roll element 503 near the peripheral surface thereof, are positioned capacitor units 504 (only one of which is shown in the drawings). Capacitor unit 504 is firmly secured in position by embedding in a thermally conductive plastic material in the chamber 505. Capacitor unit 504 is of the type having a known variation in capacitance characteristics with changes in temperature, and is connected by means of conductors 506 extending through the axial passage 509 in shaft 501 across inductive winding 502A which is mounted on annular axially extending member 525 which is fixedly secured to shaft through intermediate member 527, fasteners 526 and 528. Capacitor 504 and winding 502A are connected in parallel to form a single circuit loop similar to that shown with capacitor 4 and winding 2 in FIGS. 1 and 2. Another capacitor, not shown, is similarly mounted in roll element 503 and similarly connected across inductive winding 502 also mounted on annular member 525. In the preferred embodiment of the invention for treatment of textile yarn, it is desirable to use two separate similar circuit arrangements, one for temperature control of the heated roll element and the other for indicating or recording purposes only to insure maximum safety and reliability.

Figure 7:
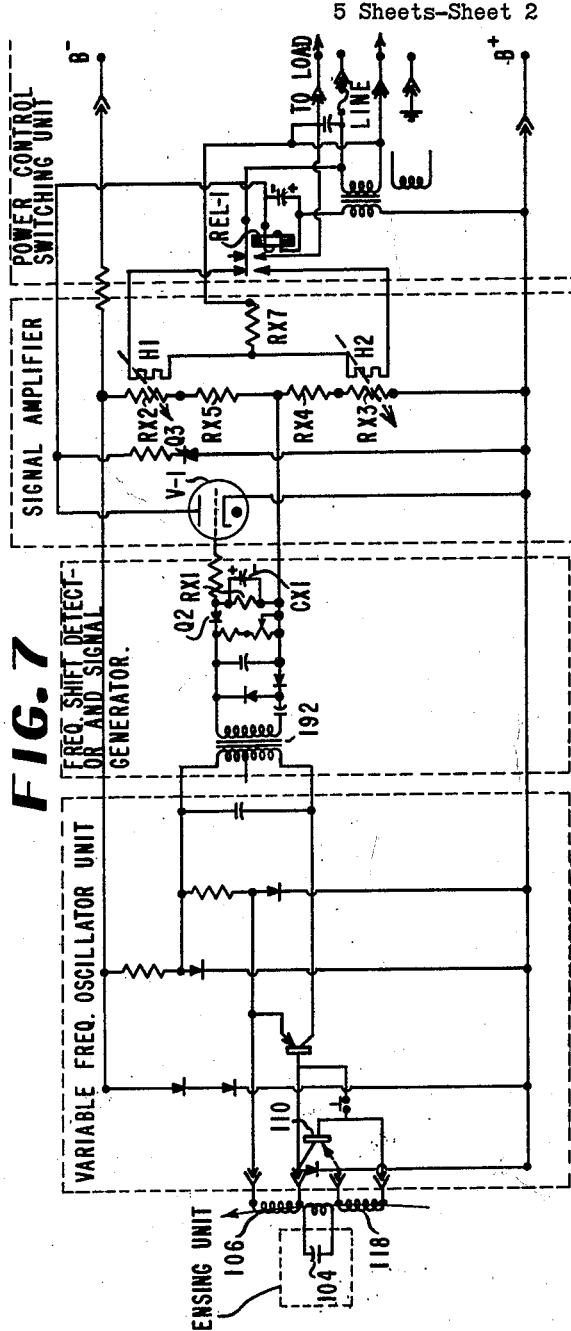
FIG. 7 is a schematic circuit diagram of a preferred embodiment of a temperature control system embodying features of this invention.

FIG. 7 illustrates a modified version of a circuit arrangement similar to that of FIG. 2 with the circuit function limited to that of control. In this figure, the variable frequency oscillator unit applies its signal to transformer 192, the output of which is then doubled and rectified to obtain a direct current voltage change which is proportional to the frequency change on the primary winding of transformer 192. This direct current voltage change is used to trigger the thyratron tube to operate the power relay for the heater unit. This circuit is also temperature stabilized to eliminate the effects of ambient temperatures on the equipment and generally operates in a similar manner to the circuit of FIG. 2. To obtain maximum sensitivity of the error signal without attenuation, the Zener diode Q2 passes current only when the signal exceeds the Zener voltage of 22 volts, and charges CX1 to the excess voltage. Increasing this voltage triggers the thyratron. The bias voltage obtained from the divider network RX2, RX3, RX4, and RX5 cuts off the thyratron. The resistors RX2 and RX3 are wound of wire which is highly temperature sensitive and are arranged to provide a means of negative feedback for proportional anti-hunting control of the output power to the controlled load and compensate for delays in functioning of the system. These resistors are thermally coupled to the small heaters $H_1$ and $H_2$. Power is furnished to these heaters by the pilot contacts on the relay REL-1. It can be seen that when REL-1 is deenergized that RX2 will be heated causing the bias voltage to trigger thyratron V-1 early. Also upon the energization of REL-1, RX3 will be heated and cause an early cut off. The relay REL-1 is polarized for safety reasons and is reset to off position when V-1 is not conducting by action of the diode Q-3.

FIG. 8 illustrates a modified version of a circuit arrangement similar to that of FIG. 7 with the circuit function limited to that of indicating and for recording the condition to which the capacitor is responsive, which condition in my preferred embodiment is temperature. Also included is the transistorized regulated power supply which supplies the bias and D.C. power to the control circuit shown in FIG. 7. The resistor RX6 of FIG. 7 is for ambient temperature compensation and is wound of balco wire. The resistors RX7 (FIG. 7) and RX6 (FIG. 8) are wound of balco temperature sensitive wire and are used to correct the bias voltage for ambient temperature changes which cause a drift of the electrical characteristics of circuit components.

Referring to FIG. 1A by way of general summary it will be seen that in general, any change in the desired temperature of the moving object, by reason of the changed characteristics of the temperature sensitive capacitor, will change the frequency of the oscillator. The change in oscillator frequency is then converted to a direct current signal which is amplified and used to control the power to the heater unit so that the moving object will be restored to the desired temperature. The heat output can be controlled by an on-off system or by input power signals proportional to the temperature change.

The nature of the preferred temperature sensing capacitor element is covered in the following discussion. The capacitor preferably used is of ceramic construction, of rugged construction to withstand continuous high rotational accelerations, forces, and vibrations, and possesses capacitance characteristics which vary predictably with temperature from about 150° C. to at least 250° C. The value of the capacitance of the unit illustrated in the drawings is about 400 mmf. at 190° C. As to more specific construction of this capacitor, it consists of a flat ceramic wafer-like element of very small size, less than half an inch in diameter, with a highly conductive metallic plating applied to each side of the element to form the desired electrical relationship with the ceramic dielectric material. Lead wires are suitably attached to each side of the element to form the necessary connections or terminals. It is not believed that a capacitor has previously been used to measure temperature as disclosed herein.

It is obvious that there are many applications that can be made of this invention, beside equipment for the treatment of textile yarns. Any situation in which it is desired to sense a temperature on a rotating object and generate a signal which will instantaneously respond to changes in the temperature can beneficially utilize this invention. Examples of such situations would be, laundry drying equipment, industrial tumbling apparatus, turbine installations. Other applications are feasible in which a moving body carrying the capacitor-inductive winding parallel circuit is but momentarily coupled to a set of oscillating windings at one or more positions along its path of movement to give temperature reading at such positions.

In accordance with the patent statutes I have described in detail a preferred embodiment of my invention and modifications thereof. Further modifications will occur to persons skilled in the art, and all such are considered to fall within the spirit and scope of the invention as defined in the appended claims.

I claim:

1. An improved simplified temperature stabilizing system for measuring and closely controlling the temperature of a rapidly rotating member, said system comprising in combination, a rotatable member positioned in a control zone defined by a supporting frame structure, a heat exchange unit in said zone adjacent said rotatable member, a power source connected to operate said heat exchange unit, a control mechanism operatively connected to said heat exchange unit, an electrical oscillator device mounted in said frame structure, said oscillator device comprising a first inductive winding for creating a first magnetic field, a direct current power source, a normally closed electrical switching means connecting said power source with said first inductive winding, a second inductive winding positioned to be inductively coupled to said first inductive winding upon creation of the first magnetic field, said second winding connected to said switching means and arranged to actuate said switching means to open condition to disconnect said switching means and said first winding for a finite time interval after, and in response to, creation of the magnetic field so that the magnetic field is created and terminated continuously periodically at a given frequency, a circuit arrangement positioned on said rotatable member and comprising a temperature variable capacitance element connected across a third inductive winding, said third winding constructed and arranged to inductively couple the variable capacitance element into the pulsating magnetic field of the first winding to vary the given frequency in the same direction and in proportion to variation of the temperature of said rotatable member, ambient temperature sensitive electrical means cooperating with said oscillator device and said control mechanism for detecting variations in the given frequency, and converting such variations into signals for controlling said heat exchange unit to change the temperature of said member in a manner to bring the changed oscillator frequency back to said given frequency.

2. The system of claim 1 in which said oscillator device and said electrical means are provided with ambient temperature compensating means and said switching means comprises a transistor element.

3. The system of claim 1 in which said electrical means comprises an anti-hunt circuit arrangement for modifying the signals for controlling said heat exchange unit.

References Cited in the file of this patent

UNITED STATES PATENTS

| 1,871,325 | Keen | Aug. 9, 1932 |
| 1,951,276 | Edwards | Mar. 13, 1934 |
| 2,027,193 | Muth | Jan. 7, 1936 |
| 2,056,285 | Machlet | Oct. 6, 1936 |
| 2,095,877 | Junkins | Oct. 12, 1937 |
| 2,575,922 | Langenwalter | Nov. 20, 1951 |
| 2,791,693 | Moore | May 7, 1957 |
| 2,806,200 | Ketchledge | Sept. 10, 1957 |
| 2,823,861 | Davis | Feb. 18, 1958 |
| 2,886,755 | Ehret | May 12, 1959 |